US010962772B2

(12) United States Patent
Kang et al.

(10) Patent No.: US 10,962,772 B2
(45) Date of Patent: Mar. 30, 2021

(54) METHOD OF REMOVING REFLECTION AREA, AND EYE TRACKING METHOD AND APPARATUS

(71) Applicant: SAMSUNG ELECTRONICS CO., LTD., Suwon-si (KR)

(72) Inventors: Dongwoo Kang, Seoul (KR); Jingu Heo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 251 days.

(21) Appl. No.: 15/981,483

(22) Filed: May 16, 2018

(65) Prior Publication Data

US 2019/0129165 A1 May 2, 2019

(30) Foreign Application Priority Data

Oct. 27, 2017 (KR) .................. 10-2017-0141339

(51) Int. Cl.
*G02B 27/00* (2006.01)
*G06F 3/01* (2006.01)
*G06F 3/03* (2006.01)
*G06N 3/08* (2006.01)
*G06F 3/08* (2006.01)

(52) U.S. Cl.
CPC ..... *G02B 27/0093* (2013.01); *G02B 27/0025* (2013.01); *G06F 3/013* (2013.01); *G06F 3/0304* (2013.01); *G06N 3/08* (2013.01)

(58) Field of Classification Search
CPC . G02B 27/0093; G02B 27/0025; G06F 3/013; G06F 3/0304; G06N 3/08

USPC ................... 351/205–206, 209, 246
See application file for complete search history.

(56) References Cited

U.S. PATENT DOCUMENTS

| 5,905,562 A * | 5/1999 | Isogai ................. A61B 3/156 351/205 |
| 6,697,506 B1 * | 2/2004 | Qian ................... G06T 7/0012 382/128 |
| 10,789,714 B2 * | 9/2020 | Kang .................. G06K 9/0061 |
| 2007/0177103 A1 * | 8/2007 | Migliaccio ............ A61B 3/113 351/206 |
| 2007/0280505 A1 * | 12/2007 | Breed ................... B60W 40/08 382/104 |

(Continued)

FOREIGN PATENT DOCUMENTS

| JP | 2002-352229 A | 12/2002 |
| JP | 2003-339642 A | 12/2003 |

(Continued)

OTHER PUBLICATIONS

Communication dated Mar. 13, 2019, issued by the European Patent Office in counterpart European Application No. 18202766.4.

(Continued)

*Primary Examiner* — James R Greece
(74) *Attorney, Agent, or Firm* — Sughrue Mion, PLLC

(57) ABSTRACT

An eye tracking method and apparatus is provided. The eye tracking method includes determining whether a reflection area generated by an illumination is included in an input image, removing the reflection area from the input image in response to a determination that the reflection area is included in the input image, and outputting coordinates of an eye of a user from an image in which the reflection area is removed.

20 Claims, 9 Drawing Sheets

(56) References Cited

U.S. PATENT DOCUMENTS

| | | | |
|---|---|---|---|
| 2014/0064614 A1 | 3/2014 | Hung et al. | |
| 2015/0310253 A1 | 10/2015 | Agrawal et al. | |
| 2016/0170486 A1 | 6/2016 | Rydberg et al. | |
| 2016/0270655 A1* | 9/2016 | Caraffi | A61B 3/113 |
| 2017/0031435 A1 | 2/2017 | Raffle et al. | |
| 2017/0147858 A1* | 5/2017 | Bennett | G06K 9/0061 |

FOREIGN PATENT DOCUMENTS

| | | |
|---|---|---|
| KR | 10-0850357 B1 | 8/2008 |
| KR | 10-2016-0110741 A | 9/2016 |
| KR | 10-1673701 B1 | 11/2016 |
| KR | 10-2017-0070110 A | 6/2017 |
| WO | 2016/131075 A1 | 8/2016 |

OTHER PUBLICATIONS

Ebisawa, Y., "Improved video-based eye-gaze detection method", Aug. 4, 1998, IEEE Transactions on Instrumentation and Measurement, vol. 47, No. 4, 8 pages total.

\* cited by examiner

800

900

METHOD OF REMOVING REFLECTION AREA, AND EYE TRACKING METHOD AND APPARATUS

CROSS-REFERENCE TO RELATED APPLICATION

This application claims priority from Korean Patent Application No. 10-2017-0141339 filed on Oct. 27, 2017 in the Korean Intellectual Property Office, the disclosure of which is incorporated herein by reference in its entirety.

BACKGROUND

1. Field

Methods and apparatuses consistent with example embodiments relate to removing a reflection area, and tracking eyes of a user.

2. Description of Related Art

A camera-based eye tracking technology is used in various fields, such as, for example, a viewpoint tracking-based autostereoscopic or glassless three-dimensional (3D) super-multiview (SMV) display, and the like. A camera-based eye tracking apparatus may operate desirably in a bright environment, or at a high illumination, for example, 400 lux. However, the eye tracking apparatus may not operate desirably in a dark environment, or at a low illumination, due to a low quality of an image to be captured by a camera in such an environment. Thus, there is a need for an eye tracking apparatus to operate desirably in the dark environment in addition to the bright environment, in consideration of television (TV) watching and frequent use of mobile devices in a bright or dark environment, and also considering nighttime driving for next-generation vehicle 3D head-up display (HUD) technology.

To track an eye of a user using a color camera in a low-illumination environment, for example, at night or in a dark place, the quality of an image to be captured in such an environment may be relatively low, and also an accuracy and a success rate of eye tracking may decrease in such an environment. However, when tracking eyes of a user who wears eyeglasses using the infrared camera which may increase the quality of an image captured, the accuracy and the success rate of the eye tracking may also decrease due to a reflection at, for example, lenses of the eyeglasses caused by illumination of the infrared camera.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided an eye tracking method including determining whether a reflection area generated by an illumination is included in an input image, in response to a determination that the reflection area is included, removing the reflection area from the input image, and outputting coordinates corresponding to an eye of a user from an image in which the reflection area is removed.

The removing of the reflection area may include removing the reflection area by processing the input image including the reflection area using a parameter learned through machine learning based on a database including the image in which the reflection area is removed.

The removing of the reflection area may include removing the reflection area from the input image through image processing based on an illumination compensation algorithm.

The illumination compensation algorithm may include an inpainting algorithm configured to restore the reflection area using a patch corresponding to a partial area of the input image.

The removing of the reflection area may include determining a mask area for image restoration by expanding the reflection area, and removing the reflection area by performing, on the mask area, the image processing based on the illumination compensation algorithm.

The eye tracking method may further include performing smoothing on an edge portion of the mask area which is image processed.

The determining of whether the reflection area is included may include determining whether the reflection area is included based on whether an area having a pixel value greater than a preset threshold value is included in the input image.

The eye tracking method may further include configuring a database for machine learning using the image in which the reflection area is removed.

The reflection area may include at least one of a reflection area of an eyeglass lens, a reflection area of an eye, and a reflection area around the eye that is generated by an infrared illumination, or a combination thereof.

According to another aspect of an example embodiment, there is provided a method of removing a reflection area, including determining whether a reflection area generated by an illumination is included in an input image, and in response to a determination that the reflection area is included, removing the reflection area by processing the input image including the reflection area using a parameter learned through machine learning based on a database including an image in which the reflection area is removed.

According to another aspect of an example embodiment, there is provided a method of removing a reflection area, including determining whether a reflection area generated by an illumination is included in an input image, wherein the reflection area comprises at least one of a reflection area of an eyeglass lens, a reflection area of an eye, or a reflection area around the eye that is generated by the illumination, in response to a determination that the reflection area is included, determining a mask area for image restoration by expanding the reflection area, and removing the reflection area by performing, on the mask area, image processing based on an illumination compensation algorithm.

The method may further include performing smoothing on an edge portion of the mask area which is image processed.

A non-transitory computer-readable storage medium may store instructions to be executed by a processor to perform the eye tracking method.

According to another aspect of an example embodiment, there is provided an eye tracking apparatus including a capturer configured to obtain an input image, and a processor configured to determine whether a reflection area generated by an illumination is included in the input image, remove the reflection area from the input image in response to a determination that the reflection area is included, and output coordinates corresponding to an eye of a user from an image in which the reflection area is removed.

The eye tracking apparatus may further include a memory configured to store a parameter learned through machine learning based on a database comprising the image in which the reflection area is removed, wherein the processor may be further configured to remove the reflection area by processing the input image comprising the reflection area using the parameter.

The processor may be further configured to remove the reflection area from the input image through image processing based on an illumination compensation algorithm.

The processor may be further configured to determine a mask area by expanding the reflection area, and remove the reflection area by performing, on the mask area, the image processing based on the illumination compensation algorithm.

The processor may be further configured to perform smoothing on an edge portion of the mask area obtained by performing the image processing.

The processor may be further configured to determine whether the reflection area is included based on whether an area having a pixel value greater than a preset threshold value is included in the input image.

The reflection area may include at least one of a reflection area of an eyeglass lens, a reflection area of an eye, and a reflection area around the eye that is generated by an infrared illumination, or a combination thereof.

BRIEF DESCRIPTION OF THE DRAWINGS

The above and/or other aspects will be more apparent by describing certain example embodiments, taken in conjunction with the accompanying drawings, in which.

DETAILED DESCRIPTION

Figure 1:
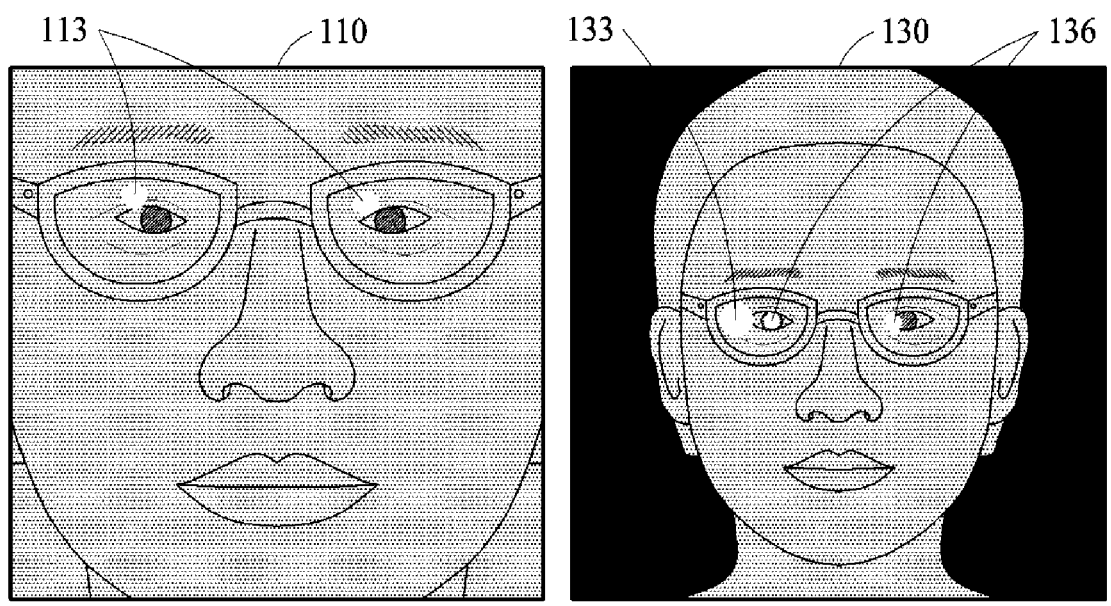
FIG. 1 is a diagram illustrating an example of a pupil or a shape of an eye being occluded due to a reflection by an infrared light source according to an example embodiment.

Reference will now be made in detail to example embodiments, examples of which are illustrated in the accompanying drawings, wherein like reference numerals refer to the like elements throughout.

The following structural or functional descriptions are exemplary to merely describe the example embodiments, and the scope of the example embodiments is not limited to the descriptions provided in the present disclosure. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the example embodiments of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises," "comprising," "includes," and/or "including," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Example embodiments to be described hereinafter may be applicable to, for example, an auto stereoscopic or glassless three-dimensional (3D) monitor, an autostereoscopic or glassless 3D tablet or smartphone, a vehicle 3D head-up display (HUD), and the like, to track an eye of a user using an infrared camera and output coordinates of the eye. The example embodiments may be configured, for example, in a form of a software algorithm in a chip of a monitor, an application in a tablet or a smartphone, and a hardware eye tracking apparatus. The example embodiments may be applicable to, for example, an autonomous driving vehicle, an intelligent vehicle, a smartphone, a mobile device, and the like.

FIG. 1 is a diagram illustrating an example of a pupil or a shape of an eye being occluded due to a reflection by an infrared light source according to an example embodiment. FIG. 1 illustrates images 110 and 130 obtained using a single infrared camera.

For example, it may be easier to identify an eye, a nose, a lip, and a shape of a face from the images 110 and 130 obtained by capturing a face image of a user by the infrared camera because a shade may not occur even in a low illumination, compared to an image captured by a color camera.

However, in a case in which the user wears eyeglasses, a reflection area 113 may be generated in an area around an eye of the user by an infrared light source used for the infrared camera. A reflection area 136 may be generated in an eye of the user, and/or a reflection area 133 may be generated in a lens of the eyeglass. The reflection areas 113, 133, and 136 may cover or occlude a pupil or a shape of an eye of the user, and thus, may affect shape alignment for tracking the eye of the user or a location of the eye, and may reduce an accuracy and/or a success rate of such eye tracking.

According to an example embodiment, by removing a reflection area included in an input image through machine learning or image processing based on various illumination compensation algorithms, an accuracy and a success rate of eye tracking may be improved without having to use a separate large camera device and an infrared light source or maintaining a preset distance between the camera and the infrared light source.

Figure 2:
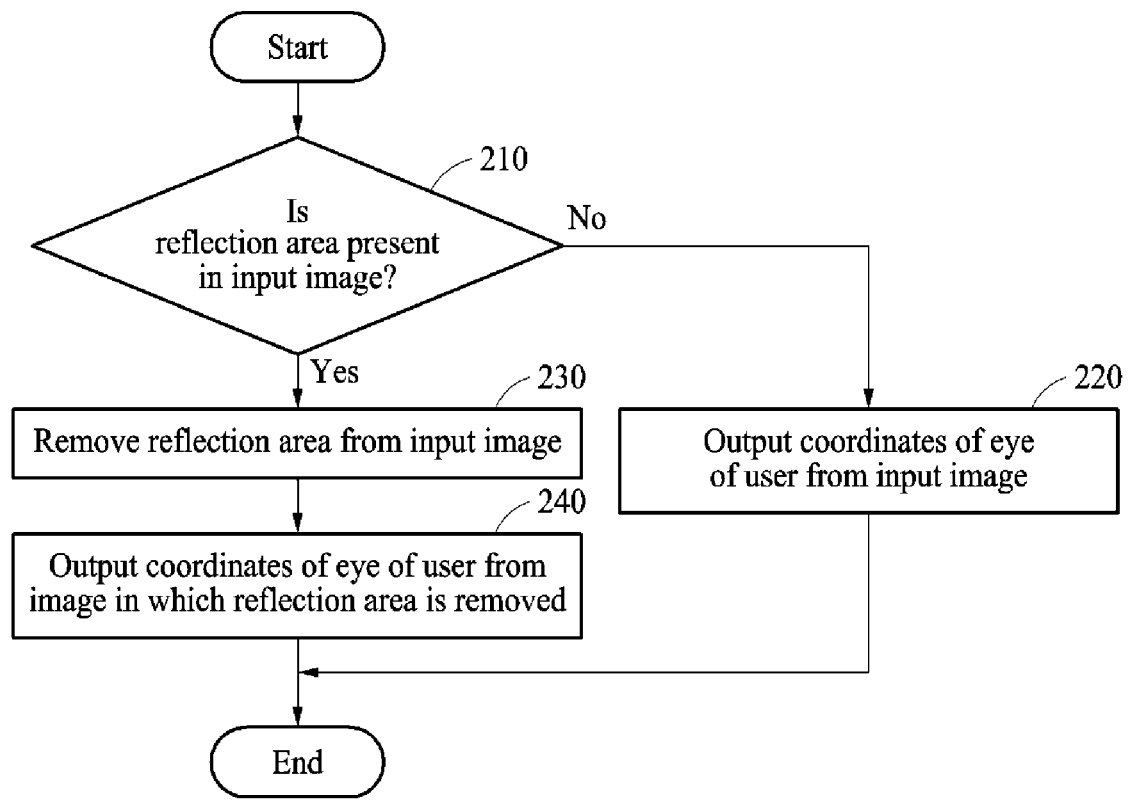
FIG. 2 is a flowchart illustrating an example of an eye tracking method according to an example embodiment.

FIG. 2 is a flowchart illustrating an example of an eye tracking method according to an example embodiment. Referring to FIG. 2, in operation 210, an eye tracking apparatus determines whether a reflection area generated by an illumination is present in an input image. The input image used herein may be, for example, a face image including an eye of a user and a body image including a face of the user. The input image may be an image captured directly by an infrared camera or an image sensor included in the eye tracking apparatus, or an infrared image captured by and received from outside of the eye tracking apparatus.

For example, the reflection area may have a relatively high pixel value that is more rapidly changed compared to that of a nearby area. The eye tracking apparatus may determine a presence or an absence of the reflection area based on whether an area having a pixel value greater than a preset threshold value is present in the input image. The reflection area may include, for example, a reflection area of a lens of eyeglass generated by an infrared illumination, a reflection area of an eye, and/or a reflection area around the eye. In operation 220, in response to a determination that the reflection area is not present in the input image in operation 210, the eye tracking apparatus outputs coordinates of the eye of the user from the input image.

In operation 230, in response to a determination that the reflection area is present in the input image in operation 210, the eye tracking apparatus removes the reflection area from the input image. Here, the expression "remove ore removing a reflection area" may include to restore a reflection area of an input image to be an area of an image in which a reflection by a light source does not occur. For example, the eye tracking apparatus may remove the reflection area through machine learning or using a prelearned or pretrained neural network. The eye tracking apparatus may remove the reflection area by processing the input image including the reflection area through machine learning based on a database including an image in which the reflection area is removed, or using a parameter learned or trained by the neural network. The machine learning may be performed by, for example, adaptive boosting (adaboost) or a support vector machine (SVM). However, examples of an applicable method are not limited to the examples described in the foregoing, and other learning or training methods may be applied. The neural network may include a recurrent neural network (RNN) or a convolutional neural network (CNN). However, examples of the neural network are not limited to the examples described in the foregoing, and other various neural networks may be applied.

Alternatively, the eye tracking apparatus may remove the reflection area from the input image through image processing based on various illumination compensation algorithms. An illumination compensation algorithm may be used to remove only a reflection area, or an area in which a reflection occurs due to an illumination, while maintaining a shape of a nose, a lip, a pupil, and the like in which a reflection does not occur due to an illumination.

The illumination compensation algorithm may include, for example, a Telea inpainting algorithm configured to restore a reflection area using a patch corresponding to a partial area of an input image, a Navier-Stokes (NS)-based inpainting algorithm, and the like. A method of removing a reflection area by the eye tracking apparatus will be described in greater detail with reference to FIG. 3.

In operation 240, the eye tracking apparatus outputs coordinates of the eye of the user from the image in which the reflection area is removed. The eye tracking apparatus may include a plurality of classifiers configured to recognize feature points corresponding to the eye of the user from an image, for example, the image in which the reflection area is removed. A classifier may recognize feature points or landmarks corresponding to eyes and a nose of the user from a face area in the input image using, for example, an active shape model (ASM), an active appearance model (AAM), and a supervised descent method (SDM). The eye tracking apparatus may output the coordinates of the eye of the user from the image in which the reflection area is removed using the plurality of classifiers configured to recognize the feature points corresponding to the eye.

In addition, the eye tracking apparatus may configure the database for the machine learning using the image in which the reflection area is removed.

Figure 3:
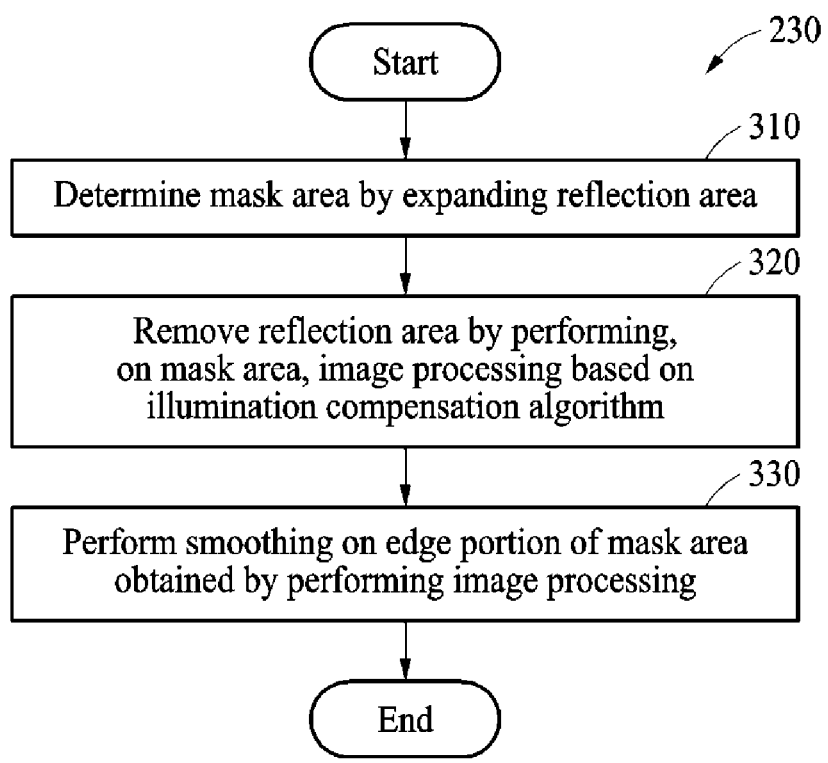
FIG. 3 is a flowchart illustrating an example of a method of removing a reflection area according to an example embodiment.
Figure 4:
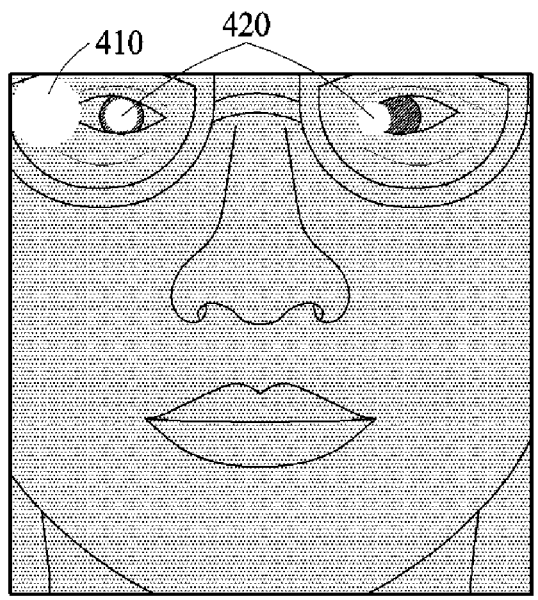
FIG. 4 is a diagram illustrating an example of a method of removing a reflection area according to an example embodiment.
Figure 4:
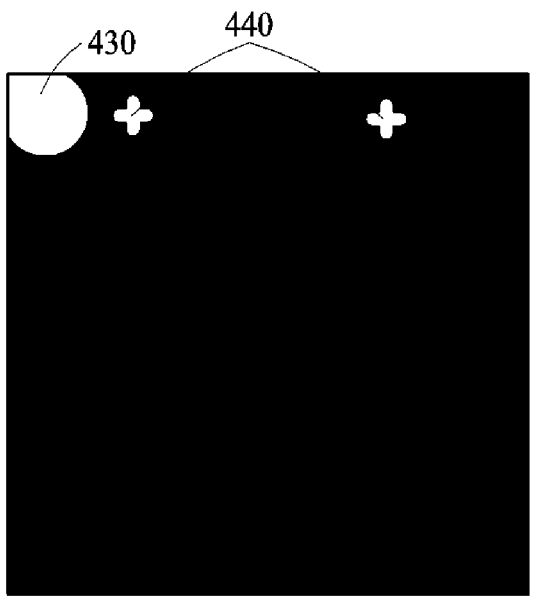
Figure 4:
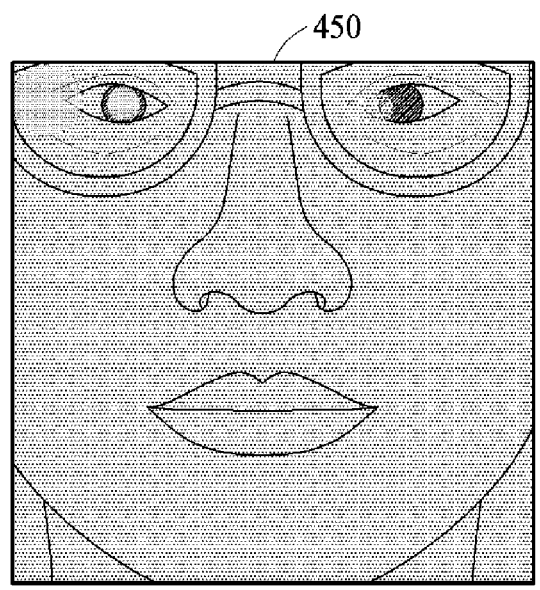

FIG. 3 is a flowchart illustrating an example of a method of removing a reflection area according to an example embodiment. Referring to FIG. 3, in operation 310, an eye tracking apparatus determines a mask area by expanding a reflection area. For example, the eye tracking apparatus may determine, to be the mask area, an area obtained by expanding the entire reflection area at a predetermined ratio or an area obtained by expanding the reflection area leftwards and rightwards. The mask area may be determined as illustrated in FIG. 4, for example, a mask area 430 and a mask area 440.

In operation 320, the eye tracking apparatus removes the reflection area by performing, on the mask area, image processing based on an illumination compensation algorithm.

In operation 330, the eye tracking apparatus performs smoothing on an edge portion of a mask area obtained by performing the image processing. The eye tracking apparatus may perform the smoothing on the edge portion using, for example, a histogram equalization algorithm, a spline smoothing algorithm, and the like. The histogram equalization algorithm may be used to make an image clear and distinct by filling in all possible areas in the entire image by equally distributing pixel values of the image through contrast adjustment. The histogram equalization algorithm may use, for example, a uniform function or a Gaussian function.

The eye tracking apparatus may perform the smoothing on the edge portion of the mask area and reduce a gradient difference between the reflection area and neighboring areas, and thus, may enable a more natural representation of the reflection area.

FIG. 4 is a diagram illustrating an example of a method of removing a reflection area according to an example embodiment. For example, under an assumption that an input image includes reflection areas 410 and 420 having pixel values that are rapidly increased compared to those of neighboring areas or having pixel values greater than a preset threshold value, an eye tracking apparatus may determine that a reflection area generated by an illumination is present in the input image and remove the reflection area as follows.

As illustrated in FIG. 4, the eye tracking apparatus determines mask areas 430 and 440 obtained by expanding the reflection areas 410 and 420, respectively, leftwards and rightwards. The eye tracking apparatus may remove the reflection areas 410 and 420 by performing image processing on the mask areas 430 and 440 by applying an illumination compensation algorithm, for example, a Telea inpainting algorithm and an NS inpainting algorithm. Here, an image 450 in which the reflection areas 410 and 420 are removed may be obtained. Through the image processing, the eye tracking apparatus may remove a reflection area by performing smoothing on an edge portion of a mask area or an edge portion of the reflection area to be blurred.

Figure 5:
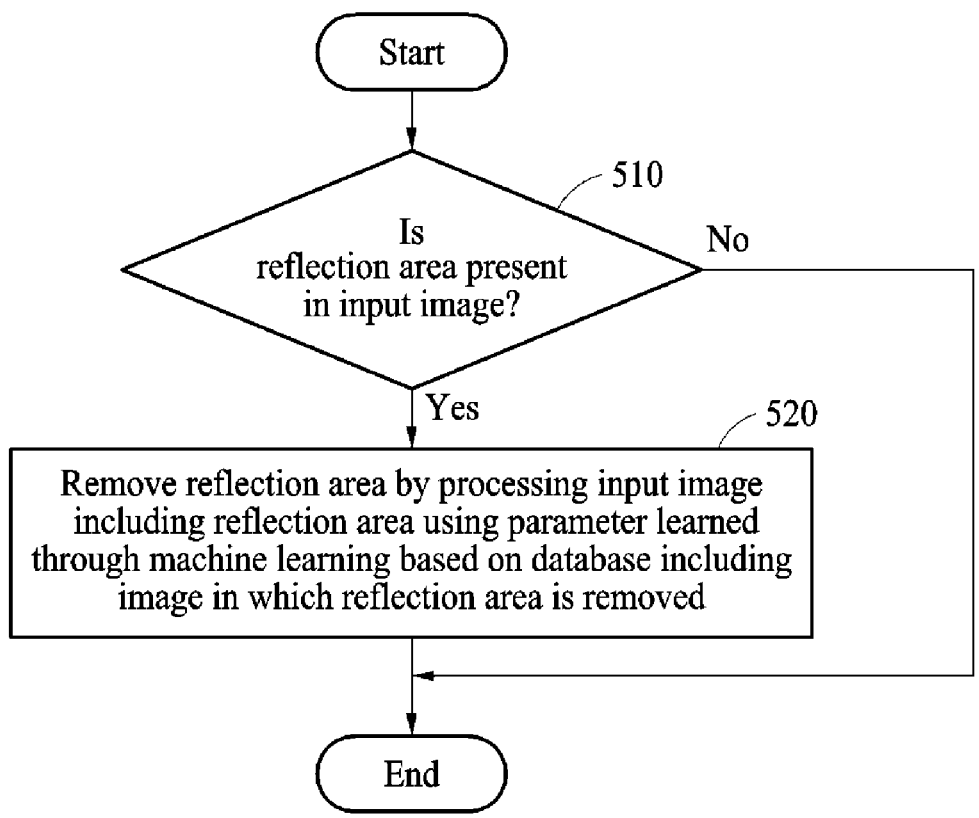
FIG. 5 and FIG. 6 are flowcharts illustrating examples of a method of removing a reflection area according to example embodiments.

FIG. 5 is a flowchart illustrating an example of a method of removing a reflection area according to an example embodiment. Referring to FIG. 5, in operation 510, an apparatus for removing a reflection area, hereinafter simply referred to as a reflection area removing apparatus, determines whether a reflection area generated by an illumination is present in an input image. In response to a determination that the reflection area is not present in the input image in operation 510, the reflection area removing apparatus terminates operations.

In operation 520, in response to a determination that the reflection area is present in the input image in operation 510, the reflection area removing apparatus removes the reflection area by processing the input image including the reflection area using a parameter learned through machine learning. The parameter may be learned or trained based on a database including an image in which the reflection area is removed.

Figure 6:
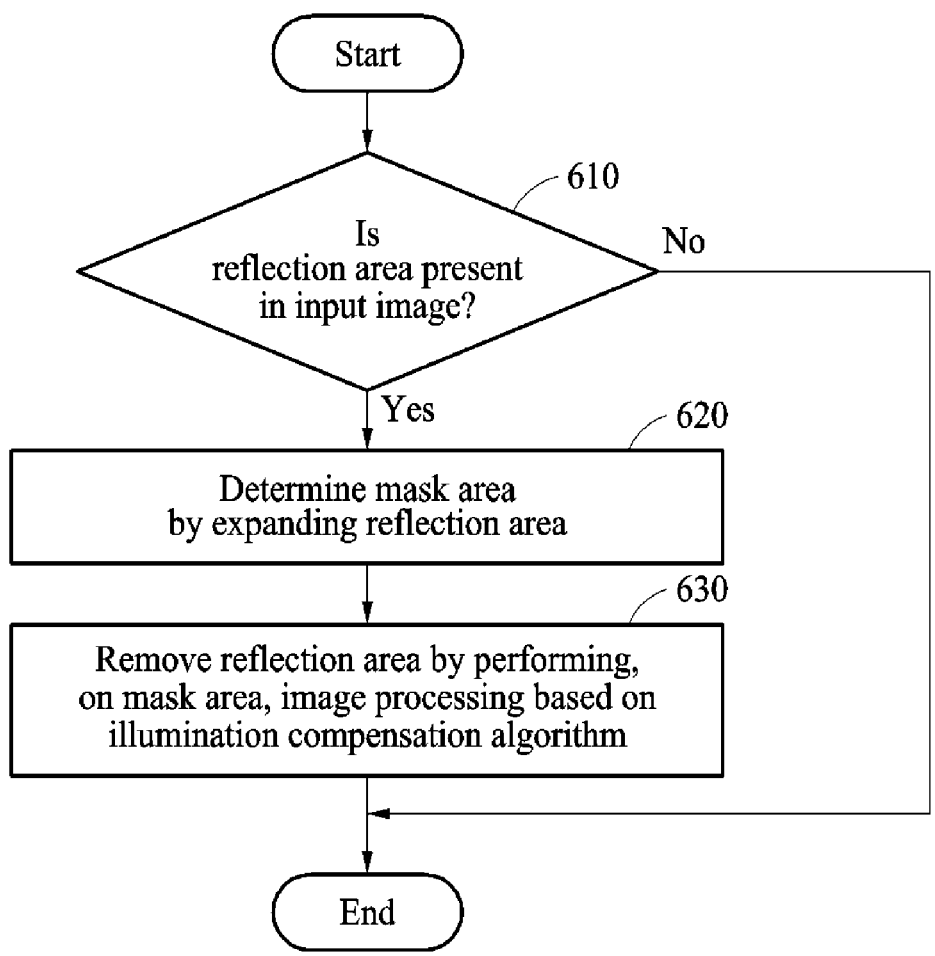

FIG. 6 is a flowchart illustrating an example of a method of removing a reflection area according to an example embodiment. Referring to FIG. 6, in operation 610, a reflection area removing apparatus determines whether a reflection area generated by an illumination is present in an input image. The reflection area may include a reflection area of a lens of eyeglass, a reflection area of an eye, and/or a reflection area around the eye that is generated by an infrared illumination. In response to a determination that the reflection area is not present in the input image in operation 610, the reflection area removing apparatus terminates operations.

In operation 620, in response to a determination that the reflection area is present in the input image in operation 610, the reflection area removing apparatus determines a mask area for image restoration by expanding the reflection area.

In operation 630, the reflection area removing apparatus removes the reflection area by performing, on the mask area, image processing based on an illumination compensation algorithm.

In addition, the reflection area removing apparatus may perform smoothing on an edge portion of a mask area obtained by performing the image processing.

Figure 7:
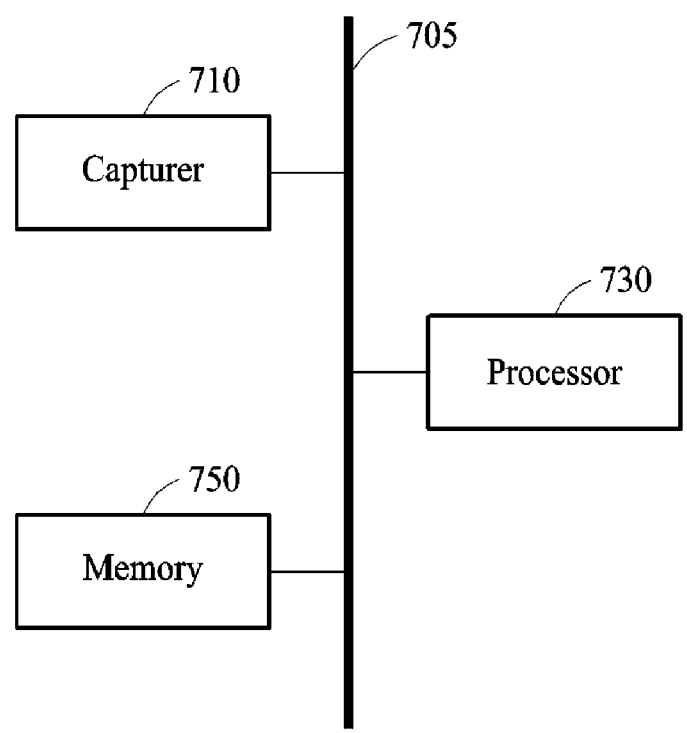
FIG. 7, FIG. 8, and FIG. 9 are diagrams illustrating examples of an eye tracking apparatus according to example embodiments.

FIG. 7 is a diagram illustrating an example of an eye tracking apparatus according to an example embodiment. Referring to FIG. 7, an eye tracking apparatus 700 includes a capturer 710 and a processor 730. The eye tracking apparatus 700 further includes a memory 750. The capturer 710, the processor 730, and the memory 750 may communicate with one another through a communication bus 705.

The capturer 710 obtains an input image. The capturer 710 may be an image sensor or an infrared camera configured to capture the input image using an infrared illumination.

The processor 730 determines whether a reflection area generated by an illumination is present in the input image. The processor 730 determines whether the reflection area is present based on whether an area having a pixel value greater than a preset threshold value is present in the input image. In response to a determination that the reflection area is present, the processor 730 removes the reflection area from the input image, and outputs coordinates an eye of the user from an image in which the reflection area is removed.

The processor 730 removes the reflection area from the input image through image processing based on an illumination compensation algorithm. The processor 730 determines a mask area by expanding the reflection area and removes the reflection area by performing, on the mask area, the image processing based on the illumination compensation algorithm. The processor 730 performs smoothing on an edge portion of a mask area obtained by performing the image processing.

The memory 750 stores a parameter learned through machine learning based on a database including the image in which the reflection area is removed. The processor 730 removes the reflection area by processing the input image including the reflection area using the parameter stored in the memory 750.

In addition to the operations described in the foregoing, the processor 730 may be configured to perform at least one of the methods described with reference to FIGS. 1 through 6. The processor 730 may execute a program, and control the eye tracking apparatus 700. A program code executed by the processor 730 may be stored in the memory 750.

Figure 8:
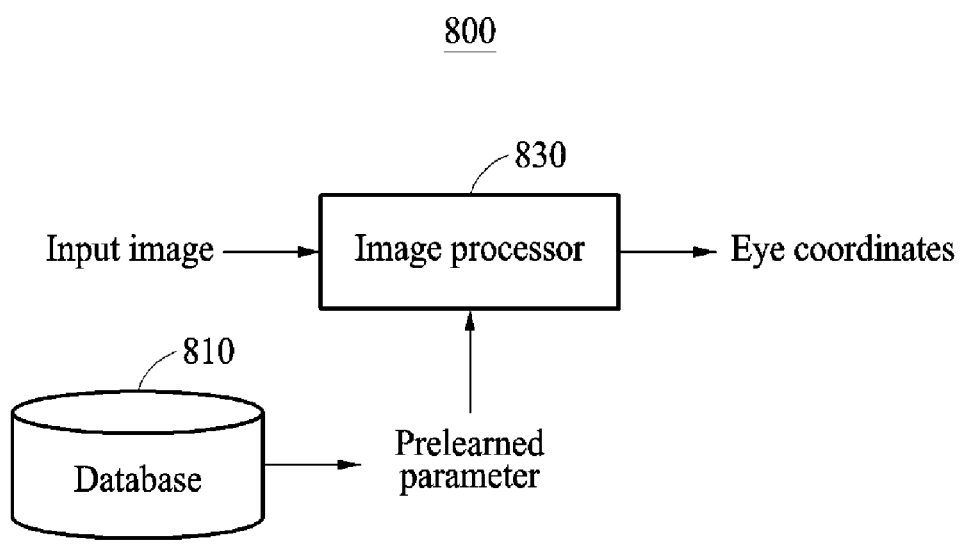

FIG. 8 is a diagram illustrating another example of an eye tracking apparatus according to an example embodiment. Referring to FIG. 8, an eye tracking apparatus 800 includes a database 810 and an image processor 830. The eye tracking apparatus 800 may operate in a low illumination, for example, an illumination equal to or less than 10 lux, and may be a low-illumination eye tracker configured to track a location of an eye of a user from an input image and output coordinates of the eye.

The database 810 may include an image in which a reflection area is removed through a reflection area removing method described above. In addition, the database 810 also includes images obtained by inversely transforming high-illumination images into low-illumination images. The database 810 may include the inversely transformed images generated by applying, to a high-illumination image, an image histogram characteristic of a low-illumination reference image that is modeled in advance using low-illumination images captured at a low illumination. In addition, the database 810 may include the inversely transformed images generated by applying, to the high-illumination image, a noise component of the low-illumination reference image in addition to the image histogram characteristic of the low-illumination reference image. The database 810 may be a low-illumination database. The database 810 may be stored in, for example, a memory (e.g., the memory 750 of FIG. 7).

The image processor 830 removes the reflection area by processing the input image including the reflection area, using a first parameter that is learned or trained in advance through machine learning based on the database 810. In addition, the image processor 830 outputs coordinates of an eye of a user by processing a low-illumination image of the user, using a second parameter that is learned or trained in advance through machine learning based on the database 810. The coordinates of the eye of the user output by the image processor 830 may be immediately used as an input to, for example, an autostereoscopic or glassless 3D display. The image processor 830 may perform operations of the processor 730 of FIG. 7, or may be the processor 730.

In addition to the operations described in the foregoing, the image processor 830 may be configured to perform at least one method described above with reference to FIGS. 1 through 7. The image processor 830 may execute a program, and control the eye tracking apparatus 800. A program code executed by the eye tracking apparatus 800 may be stored in the memory.

Figure 9:
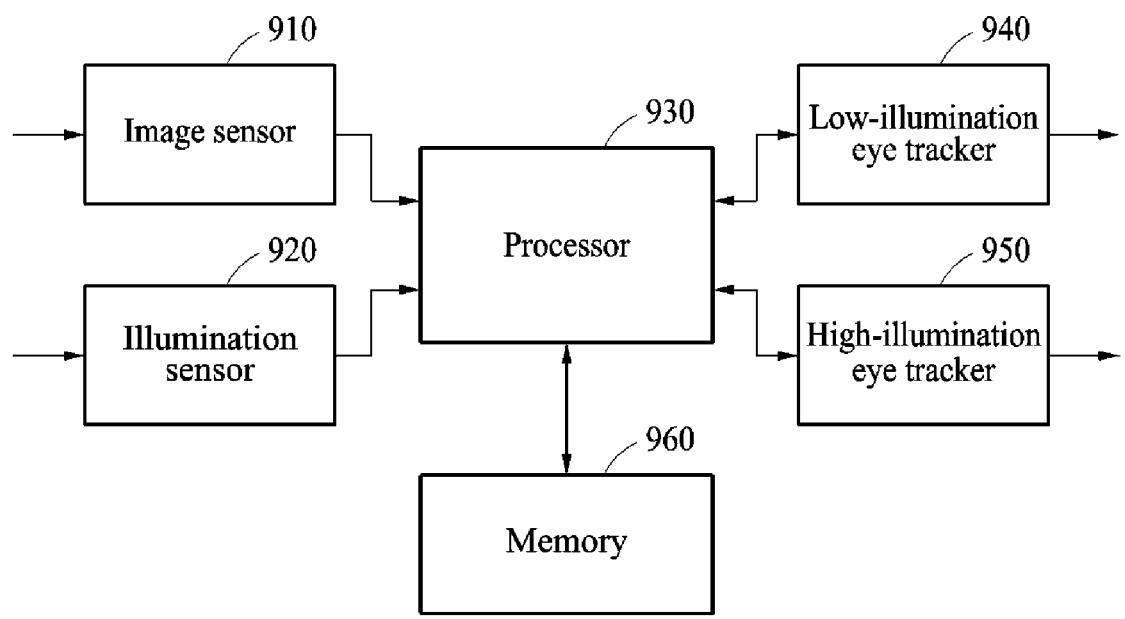

FIG. 9 is a diagram illustrating still another example of an eye tracking apparatus according to an example embodiment. Referring to FIG. 9, an eye tracking apparatus 900 includes an image sensor 910, an illumination sensor 920, a processor 930, a low-illumination eye tracker 940, and a high-illumination eye tracker 950. The eye tracking apparatus 900 further includes a memory 960.

The image sensor 910 obtains an input image by, for example, capturing the input image.

The illumination sensor 920 measures an illumination or an illuminance at a point in time at which the input image is captured.

The processor 930 operates at least one of the low-illumination eye tracker 940 or the high-illumination eye tracker 950 based on the measured illumination, and controls one of the low-illumination eye tracker 940 or the high-illumination eye tracker 950 to output coordinates of an eye of a user that is tracked from the input image.

In response to the measured illumination being equal to or less than a reference value, the processor 930 operates the low-illumination eye tracker 940 to output the coordinates of the eye of the user tracked from the input image of the user. For example, in response to the measured illumination being equal to or less than 10 lux, which is the reference value, the processor 930 may determine a low illumination and control the low-illumination eye tracker 940. The eye tracking apparatus 700 described above with reference to FIG. 7 or the eye tracking apparatus 800 described above with reference to FIG. 8 may be the low-illumination eye tracker 940.

In response to the measured illumination being greater than the reference value, the processor 930 operates the high-illumination eye tracker 950 to output the coordinates of the eye of the user tracked from input image of the user. For example, in response to the measured illumination being greater than 10 lux, which is the reference value, the processor 930 may determine a high illumination and control the high-illumination eye tracker 950.

In addition to the operations described in the foregoing, the processor 930 may be configured to execute at least one of the methods described with reference to FIGS. 1 through 8. The processor 930 may execute a program, and control the eye tracking apparatus 900. A program code executed by the processor 900 may be stored in the memory 960.

The low-illumination eye tracker 940 operates at a low illumination, for example, below a reference value, and tracks a location of the eye of the user from the input image and outputs the coordinates of the eye. The low-illumination eye tracker 940 may be learned or trained through machine learning based on a low-illumination database including images obtained by inversely transforming high-illumination images into low-illumination images. The low-illumination database may include the inversely transformed images obtained by applying, to a high-illumination image, an image histogram characteristic of a low-illumination reference image that is modeled using low-illumination images captured at a low illumination. In addition, the low-illumination database may also include the inversely transformed images obtained by applying a noise component of the low-illumination reference image to the high-illumination image in addition to the image histogram characteristic of the low-illumination reference image.

The high-illumination eye tracker 950 operates at a high illumination, for example, above a reference value, and tracks the location of the eye of the user from the input image and outputs the coordinates of the eye. The high-illumination eye tracker 950 may be learned or trained through machine learning based on a high-illumination database including high-illumination images captured at a high illumination.

Each of the low-illumination eye tracker 940 and the high-illumination eye tracker 950 includes a plurality of classifiers configured to recognize feature points corresponding to the eye of the user from the input image.

For example, the high-illumination eye tracker 950 may track the eye of the user and output the coordinates of the eye by classifiers trained in advance to recognize feature points corresponding to eyes and a nose from a face of the user based on the eye. Here, the feature points corresponding to the eyes and the nose that are obtained through the high-illumination eye tracker 950 may also be used for the low-illumination images obtained through the inverse transforming, and learned. The low-illumination images obtained through inverse transforming that are included in the low-illumination database may also include the feature points learned through machine learning based on the high-illumination database.

The memory 960 stores the input image obtained by the image sensor 910 and/or the coordinates of the eye of the user output by the low-illumination eye tracker 940 and the high-illumination eye tracker 950. According to an example embodiment, the memory 960 may include the low-illumination database and the high-illumination database.

In addition, the memory 960 stores various sets of information generated during the operations of the processor 930. The memory 960 also stores various sets of data and programs. The memory 960 may include a volatile memory or a nonvolatile memory. The memory 960 may include a massive storage medium such as a hard disk and the like to store various sets of data.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Example embodiments include non-transitory computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of non-transitory computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

While this disclosure includes specific examples, it will be apparent to one of ordinary skill in the art that various changes in form and details may be made in these examples without departing from the spirit and scope of the claims and their equivalents.

What is claimed is:

1. An eye tracking method comprising:
   determining whether a reflection area generated by an illumination is included in an input image that comprises a face of a user;
   in response to determining that the reflection area is included in the input image, removing the reflection area from the input image; and
   outputting coordinates corresponding to an eye of the user from an image in which the reflection area is removed.

2. The eye tracking method of claim 1, wherein the removing the reflection area comprises:
   removing the reflection area by processing the input image including the reflection area using a parameter learned through machine learning based on a database including the image in which the reflection area is removed.

3. The eye tracking method of claim 1, wherein the removing the reflection area comprises:
   removing the reflection area from the input image through image processing based on an illumination compensation algorithm.

4. The eye tracking method of claim 3, wherein the illumination compensation algorithm comprises an inpainting algorithm configured to restore the reflection area using a patch corresponding to a partial area of the input image.

5. The eye tracking method of claim 3, wherein the removing the reflection area comprises:
   determining a mask area for image restoration by expanding the reflection area; and
   removing the reflection area by performing, on the mask area, the image processing based on the illumination compensation algorithm.

6. The eye tracking method of claim 5, further comprising:
   performing smoothing on an edge portion of the mask area which is image processed.

7. The eye tracking method of claim 1, wherein the determining whether the reflection area is included in the input image comprises:
   determining whether the reflection area is included in the input image based on whether an area having a pixel value greater than a preset threshold value is included in the input image.

8. The eye tracking method of claim 1, further comprising:
   configuring a database for machine learning using the image in which the reflection area is removed.

9. The eye tracking method of claim 1, wherein the reflection area comprises at least one of a reflection area of an eyeglass lens, a reflection area of the eye, and a reflection area around the eye that are generated by an infrared illumination.

10. A method of removing a reflection area, the method comprising:
    determining whether a reflection area generated by an illumination is included in an input image that comprises a face of a user; and
    in response to a determination that the reflection area is included in the input image, removing the reflection area by processing the input image including the reflection area using a parameter learned through machine learning based on a database including an image in which the reflection area is removed.

11. A method of removing a reflection area, the method comprising:
    determining whether a reflection area generated by an illumination is included in an input image, wherein the reflection area includes a reflection area of an eyeglass lens that is generated by the illumination;
    in response to determining that the reflection area is included in the input image, determining a mask area for image restoration by expanding the reflection area; and
    removing the reflection area by performing, on the mask area, image processing based on an illumination compensation algorithm.

12. The method of claim 11, further comprising:
    performing smoothing on an edge portion of the mask area which is image processed.

13. A non-transitory computer-readable storage medium storing instructions that are executable by a processor to perform the eye tracking method of claim 1.

14. An eye tracking apparatus comprising:
    a capturer configured to obtain an input image; and
    a processor configured to:

determine whether a reflection area generated by an illumination is included in the input image that comprises a face of a user, remove the reflection area from the input image in response to a determination that the reflection area is included in the input image, and output coordinates corresponding to an eye of the user from an image in which the reflection area is removed.

15. The eye tracking apparatus of claim 14, further comprising:

a memory configured to store a parameter learned through machine learning based on a database including the image in which the reflection area is removed, wherein the processor is further configured to remove the reflection area by processing the input image including the reflection area using the parameter.

16. The eye tracking apparatus of claim 14, wherein the processor is further configured to remove the reflection area from the input image through image processing based on an illumination compensation algorithm.

17. The eye tracking apparatus of claim 16, wherein the processor is further configured to determine a mask area by expanding the reflection area, and remove the reflection area by performing, on the mask area, the image processing based on the illumination compensation algorithm.

18. The eye tracking apparatus of claim 17, wherein the processor is further configured to perform smoothing on an edge portion of the mask area obtained by performing the image processing.

19. The eye tracking apparatus of claim 14, wherein the processor is further configured to determine whether the reflection area is included in the input image based on whether an area having a pixel value greater than a preset threshold value is included in the input image.

20. The eye tracking apparatus of claim 14, wherein the reflection area comprises at least one of a reflection area of an eyeglass lens, a reflection area of the eye, and a reflection area around the eye that is generated by an infrared illumination.

* * * * *